United States Patent
Sung et al.

(10) Patent No.: US 9,040,183 B2
(45) Date of Patent: May 26, 2015

(54) CONNECTING STRUCTURE FOR SECONDARY BATTERY AND BATTERY PACK INCLUDING THE SAME

(71) Applicant: LG CHEM, LTD., Seoul (KR)

(72) Inventors: Jong-Gyu Sung, Cheongwon-gun (KR); Jae-Chan Lee, Cheongju-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/017,922

(22) Filed: Sep. 4, 2013

(65) Prior Publication Data

US 2014/0004392 A1 Jan. 2, 2014

Related U.S. Application Data

(63) Continuation of application No. PCT/KR2012/004549, filed on Jun. 8, 2012.

(30) Foreign Application Priority Data

Jun. 10, 2011 (KR) .................. 10-2011-0056289

(51) Int. Cl.
*H01M 14/00* (2006.01)
*H01M 2/22* (2006.01)
*H01M 2/20* (2006.01)
*H01M 2/30* (2006.01)
*H01M 10/42* (2006.01)
(Continued)

(52) U.S. Cl.
CPC .............. *H01M 2/22* (2013.01); *H01M 2/0404* (2013.01); *H01M 2/34* (2013.01); *H01M 2/20* (2013.01);
(Continued)

(58) Field of Classification Search
CPC .... H01M 10/425; H01M 2/34; H01M 2/0404
USPC ...................... 429/7, 178, 163, 175
See application file for complete search history.

(56) References Cited

U.S. PATENT DOCUMENTS

| | | | |
|---|---|---|---|
| 7,088,075 B2 | 8/2006 | Baba et al. | |
| 2006/0026822 A1 | 2/2006 | Seman, Jr. et al. | |

(Continued)

FOREIGN PATENT DOCUMENTS

| | | | |
|---|---|---|---|
| JP | 6-44956 A | 2/1994 | |
| JP | 2002-164029 A | 6/2002 | |

(Continued)

OTHER PUBLICATIONS

International Search Report for PCT/KR2012/004549 mailed on Dec. 10, 2012.

*Primary Examiner* — Milton I Cano
*Assistant Examiner* — Jimmy K Vo
(74) *Attorney, Agent, or Firm* — Birch, Stewart, Kolasch & Birch, LLP

(57) ABSTRACT

A connecting structure for a secondary battery for electrically connecting a core pack where two or more unit cells are electrically connected and a protection circuit module made of the unit cells of the core pack and a PCB substrate. The connecting structure includes a metal plate having an electrode connecting unit connected to an electrode of each unit cell of the core pack and a circuit connecting unit connected to the protection circuit module; and a circuit terminal unit electrically connected to the circuit connecting unit by being located in a connection hole formed in the PCB substrate of the protection circuit module so that the upper and lower portions of the PCB substrate communicate with each other. The circuit connecting unit is coupled and electrically connected to the circuit terminal unit by means of a connection method which allows selective connection and separation.

12 Claims, 7 Drawing Sheets

(51) Int. Cl.
  *H01M 2/10*  (2006.01)
  *H01R 11/28*  (2006.01)
  *H01M 2/04*  (2006.01)
  *H01M 2/34*  (2006.01)
  *H01M 6/44*  (2006.01)

(52) U.S. Cl.
  CPC ............... *H01M 2/202* (2013.01); *H01M 2/30* (2013.01); *H01M 10/425* (2013.01); *H01M 6/44* (2013.01); *H01M 2/105* (2013.01); *H01R 11/288* (2013.01)

(56) References Cited

U.S. PATENT DOCUMENTS

2006/0170394 A1    8/2006  Ha et al.
2009/0246615 A1*  10/2009  Park ............................... 429/149
2010/0178549 A1*   7/2010  Moom .............................. 429/158
2011/0070466 A1*   3/2011  Park et al. .......................... 429/7
2011/0129700 A1    6/2011  Hong
2012/0015240 A1*   1/2012  Baek ............................... 429/178

FOREIGN PATENT DOCUMENTS

| | | |
|---|---|---|
| JP | 2006-134801 A | 5/2006 |
| JP | 2007-508681 A | 4/2007 |
| KR | 10-2004-0018159 A | 3/2004 |
| KR | 10-2006-0073433 A | 6/2006 |
| KR | 10-2007-0065560 A | 6/2007 |
| KR | 10-2007-0075945 A | 7/2007 |
| KR | 10-0816183 B1 | 3/2008 |
| KR | 10-1023849 B1 | 3/2011 |
| KR | 10-2011-0059284 A | 6/2011 |
| WO | WO 2009066953 A2 * | 5/2009 ............. H01M 2/04 |

* cited by examiner

--Prior Art--

CONNECTING STRUCTURE FOR SECONDARY BATTERY AND BATTERY PACK INCLUDING THE SAME

CROSS-REFERENCE TO RELATED APPLICATION

The present application is a continuation of International Application No. PCT/KR2012/004549 filed on Jun. 8, 2012, which claims priority to Korean Patent Application No. 10-2011-0056289 filed in the Republic of Korea on Jun. 10, 2011, the disclosures of which are incorporated herein by reference.

BACKGROUND OF THE DISCLOSURE

1. Field of the Disclosure

The present disclosure relates to a connecting structure for a secondary battery, and more particularly, to a connecting structure for a secondary battery, which connects the secondary battery to a protection circuit module, and a secondary battery pack including the same.

2. Description of the Related Art

Along with the technical development and increased demands of mobile devices, secondary batteries are used more and more as an energy source. Among them, lithium (ion/polymer) secondary batteries with high energy density, high operation voltage and excellent preservation and life characteristics are widely used as energy sources of various electronic products as well as various mobile devices.

Such secondary batteries may be used as a single battery cell or a battery pack where a plurality of unit cells are electrically connected to each other, depending on the kind of external device used. For example, a small-sized device such as a cellular phone may operate for a predetermined time with the power and capacity of a single battery cell, but middle-sized or large-sized devices such as notebooks, portable DVD, electric vehicles and hybrid vehicles demand the use of a battery pack in order to ensure large power and capacity.

Such a battery pack generally has a 'soft pack' structure, which is prepared by connecting a protection circuit or the like to a 'core pack' having a plurality of unit cells connected in series or in parallel, packed in a hard case. In a case where the unit cell employs a rectangular or pouch-type battery, unit cells are stacked so that wide surfaces face each other, and then electrode terminals of the unit cells are connected to each other by using a connection member such as a bus bar. Therefore, in case of preparing a cubic battery pack with a hexahedral structure, the rectangular or pouch-type batteries are advantageous as the unit cells.

Meanwhile, although a cylindrical battery generally has a higher electric capacity in comparison to a rectangular or pouch-type, a cylindrical battery may not easily stack due to its appearance. However, if the battery pack has a linear or plate shape as a whole, the cylindrical battery may have a more structural advantage than the rectangular or pouch-type battery.

Therefore, in the case of notebooks or portable DVDs, a battery pack is configured with a core pack, in which a plurality of cylindrical batteries is connected in series or in parallel. Such a core pack generally uses a 2P (parallel)-3S (series) linear structure, a 2P-3S plate structure, a 2P-4S linear structure, a 2P-4S plate structure or the like.

A parallel-type connection structure is configured by arranging two or more cylindrical batteries to be adjacent to each other in a lateral direction with the electrodes being arranged in the same direction, and then welding the cylindrical batteries by using a connection member. This parallel-type cylindrical battery is also called a 'bank'.

A series-type connection structure is configured by arranging two or more cylindrical batteries in a long length so that electrode terminals with opposite polarities are successively located or by arranging two or more batteries to be adjacent to each other in their lateral direction in a state where electrode terminals are oriented toward opposite directions, and then welding the cylindrical batteries by using a connection member. As a connection member for electrical connection of such cylindrical batteries, a thin metal plate such as a nickel plate is generally used.

Meanwhile, since such a secondary battery contains various combustible materials therein, the secondary battery may heat or explode due to overcharge, overdischarge and other external physical impacts, making it very unstable. Therefore, a PCM (Protection Circuit Module) made of a PCB substrate is connected to the core pack of the battery pack in order to effectively control abnormal states such as overcharge and overdischarge.

FIG. 1 is a perspective view schematically showing a conventional battery pack. For the sake of easy understanding, FIG. 1 shows a coupling relation between a core pack and a protection circuit module in an exploded view, in which a pack case is not depicted.

As shown in FIG. 1, three electrode pairs of unit cells 11 connected to each other in parallel are connected in series by means of metal plates 20 to form a core pack 10. The metal plates 20 connected to the unit cells 11 of the core pack 10 are electrically connected to a protection circuit module 30 by means of soldering or welding.

However, the soldering or welding process for the core pack 10 and the protection circuit module 30 has the following problems. In detail, the welding or soldering process requires the skilled techniques and know-how of workers, and parameters for determining the intensity of welding should be continuously maintained, resulting in complicated and expensive production processes and serving as a factor that deteriorates the production efficiency. In addition, in the soldering or welding process for the core pack 10 and the protection circuit module 30, a short circuit may occur at the connection portion due to vibrations of the battery pack or an external impact, and an electric or thermal damage may be applied to the interface with the metal plate 20, which may become factors that threat the safety of the battery and increase the inferiority of products. In addition, the sequence of operation should be strictly obeyed during the soldering or welding process for the core pack 10 and the protection circuit module 30. If not, a great voltage is abruptly applied from the core pack 10 to the protection circuit module 30, which may damage the internal circuit of the protection circuit module 30 and cause malfunction. In particular, when there is a defect with a part of the unit cells or the protection circuit module 30 during the production process or in use, there is a disadvantage in that all components of the battery pack must be discarded.

Therefore, there is an urgent need for a technique capable of substituting a connection method using welding, soldering or the like, which demands dangerous and complicated work procedures, and allows easy connection and separation of the core pack 10 and the protection circuit module 30 while ensuring stability so that components of a battery pack may be partially reused, exchanged or repaired.

SUMMARY OF THE DISCLOSURE

Technical Problem

The present disclosure is designed to solve the problems of the prior art, and therefore it is an object of the present disclosure to provide a connecting structure for a secondary battery, which may allow electric connection using a physical connection method, which allows selective connection and separation, while excluding a soldering or welding process demanding a complicated work procedure, when connecting a core pack and a protection circuit module of a battery pack, and a battery pack including the same.

Technical Solution

In one aspect of the present disclosure, there is provided a connecting structure for a secondary battery for electrically connecting a core pack in which two or more unit cells are electrically connected and a protection circuit module made of the unit cells of the core pack and a PCB substrate, the connecting structure including: a metal plate having an electrode connecting unit connected to an electrode of each unit cell of the core pack and a circuit connecting unit connected to the protection circuit module; and a circuit terminal unit electrically connected to the circuit connecting unit by being located in a connection hole formed in the PCB substrate of the protection circuit module so that the upper and lower portions of the PCB substrate communicate with each other, wherein the circuit connecting unit is electrically connected to the circuit terminal unit by means of a physical connection method which allows selective connection and separation.

Preferably, the circuit terminal unit is surface-mounted to the upper portion of the connection hole of the PCB substrate and is electrically connected to the protection circuit module.

Preferably, the circuit terminal unit has an insert groove into which the circuit connecting unit passing through the connection hole of the PCB substrate is inserted.

Preferably, the circuit connecting unit has a plate shape, and the circuit terminal unit further includes an elastic surface surface-contacting with the circuit connecting unit in the insert groove to fix the circuit connecting unit.

Preferably, the circuit connecting unit has a plate shape and further has coupling grooves formed at both edges thereof in the width direction.

Preferably, the circuit terminal unit further includes an elastic piece inserted into the coupling groove of the circuit connecting unit in the insert groove to fix the circuit connecting unit.

Preferably, the circuit terminal unit is inserted into and coupled in the connection hole of the PCB substrate and is electrically connected to the protection circuit module.

Preferably, the circuit terminal unit has a cylindrical shape and has a hooking protrusion formed on the outer circumference thereof to pass through the connection hole of the PCB substrate and be coupled to the lower portion of the PCB substrate.

Preferably, the circuit connecting unit is fit into the circuit terminal unit.

Preferably, the circuit connecting unit has an upper portion bent perpendicularly and has a coupling unit formed at the upper surface thereof so that the circuit terminal unit is coupled thereto by fitting.

Preferably, the circuit terminal unit has a cylindrical shape and has a thread formed on the outer circumference thereof with a bolt shape.

Preferably, the circuit terminal unit is coupled to the circuit connecting unit located in the connection hole at the lower portion of the PCB substrate by bolt coupling.

Preferably, the circuit connecting unit has an upper portion bent perpendicularly and further includes a screw coupling unit formed at the upper surface thereof so that the circuit terminal unit is coupled thereto by bolt coupling.

Preferably, the metal plate is made of nickel.
Preferably, the unit cell is a cylindrical battery.
In another aspect of the present disclosure, there is also provided a battery pack including the connecting structure for a secondary battery according to the present disclosure.

Advantageous Effects

According to the present disclosure, a core pack and a protection circuit module may be electrically connected by using a physical connection method which allows selective connection and separation, while excluding a soldering or welding process demanding a complicated work procedure. In addition, it is possible to prevent the possibility of a short circuit of a battery, which may be caused in the soldering or welding process, and greatly decrease the defective rate. Moreover, since the core pack and the protection circuit module may be easily connected and separated, components of the battery pack may be partially reused, exchanged and repaired, which reduces the maintenance cost of the battery pack.

BRIEF DESCRIPTION OF THE DRAWINGS

Other objects and aspects of the present disclosure will become apparent from the following descriptions of the embodiments with reference to the accompanying drawings in which.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
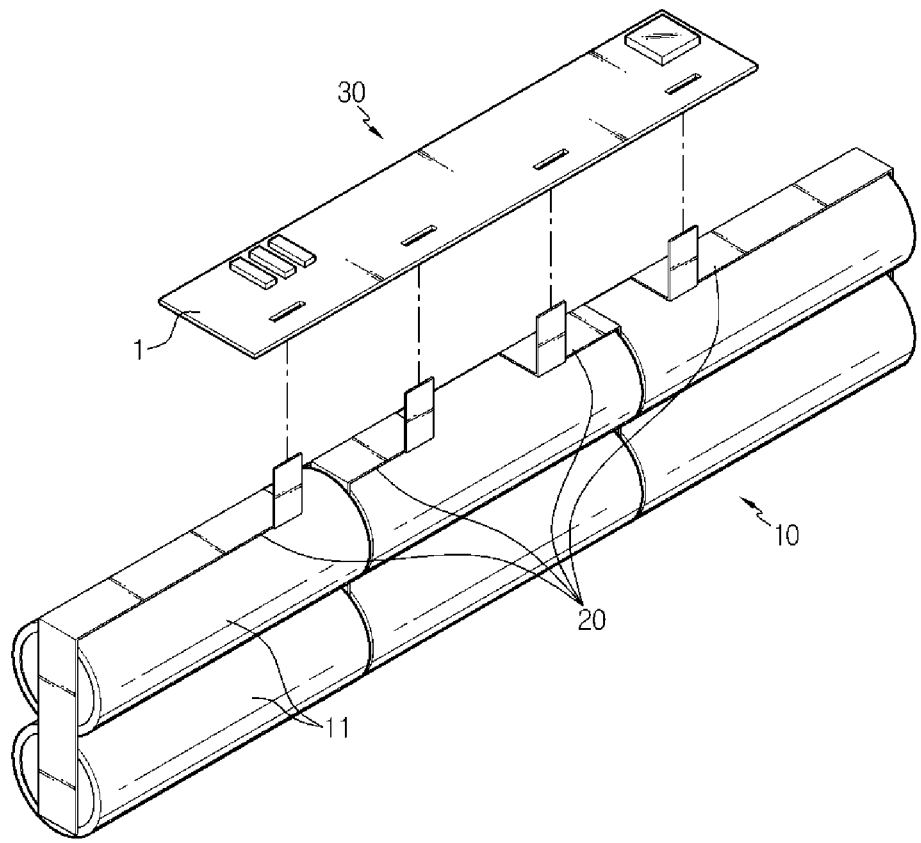
FIG. 1 is a partially-exploded perspective view schematically showing a conventional battery pack.
Figure 2:
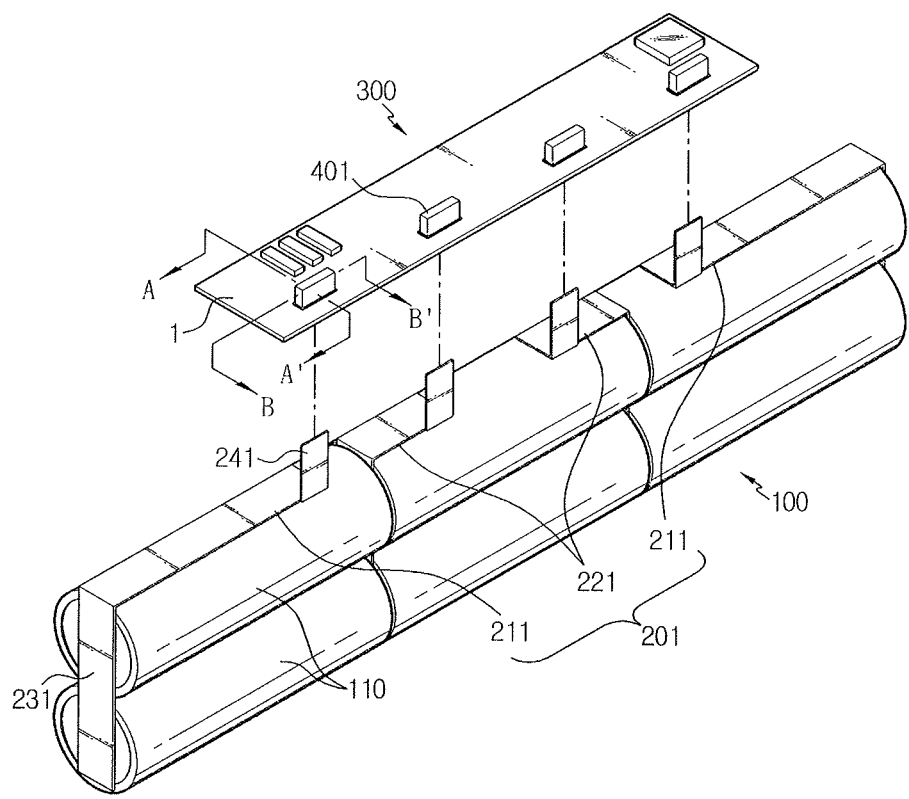
FIG. 2 is a partially-exploded perspective view schematically showing a battery pack according to a first embodiment of the present disclosure.
Figure 3:
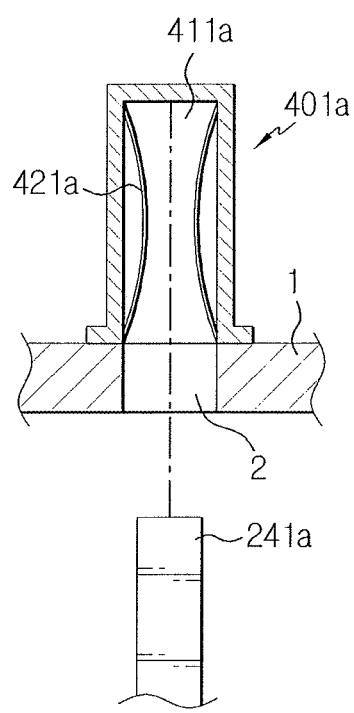
FIG. 3 is a cross-sectional view showing an example of a connecting structure for a secondary battery according to the first embodiment of the present disclosure, taken along the line A-A' of FIG. 2.
Figure 4:
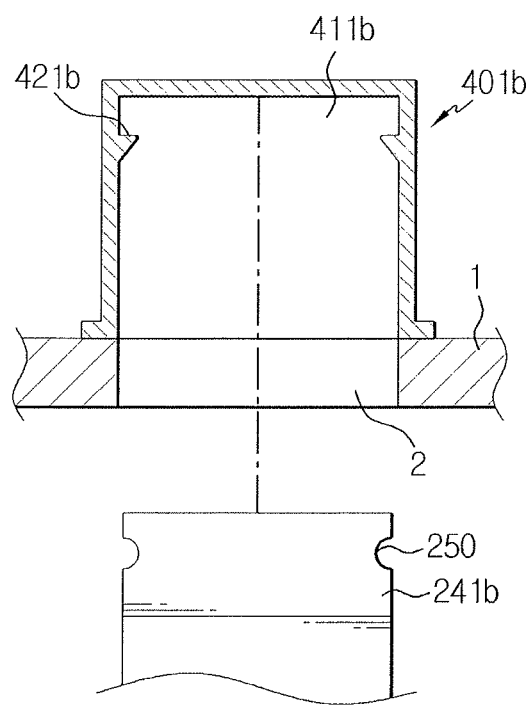
FIG. 4 is a cross-sectional view showing another example of the connecting structure for a secondary battery according to the first embodiment of the present disclosure, taken along the line B-B' of FIG. 2.

FIG. 2 is a partially-exploded perspective view schematically showing a battery pack according to a first embodiment of the present disclosure, FIG. 3 is a cross-sectional view showing an example of a connecting structure for a secondary battery according to the first embodiment of the present disclosure, taken along the line A-A' of FIG. 2, and FIG. 4 is a cross-sectional view showing another example of the connecting structure for a secondary battery according to the first embodiment of the present disclosure, taken along the line B-B' of FIG. 2.

Referring to FIG. 2, a battery pack according to the first embodiment of the present disclosure includes a core pack 100 where six unit cells 110 are arranged in a 2P (parallel)-3S (series) manner, and a soft pack where a protection circuit module 300 made of a PCB substrate 1 is electrically connected by means of four metal plates 201. Meanwhile, though not shown in FIG. 2, the soft pack may be sealed in a pack case.

The core pack 100 may form a single bank by electrically connecting a pair of unit cells 110 in parallel, and three banks may be connected in series. Here, each unit cell 110 may be a cylindrical or rectangular battery, but the cylindrical battery is preferred. Meanwhile, even though FIG. 2 depicts that the unit cells 110 of the core pack 100 are arranged in a 2P-3S manner, the present disclosure is not limited thereto and various structures such as 1P-2S, 1P-3S, 2P-2S, 2P-4S or the like may be applied, as obvious to those skilled in the art.

The metal plate 201 is used for electrically connecting each unit cell 110 of the core pack 100 to the protection circuit module 300 and includes an electrode connecting unit 231 connected to an electrode of each unit cell 110 and a circuit connecting unit 241 connected to the protection circuit module 300.

The metal plate 201 is prepared to have an integrated thin plate structure by using pure nickel, nickel-plated steel sheet (Ni-top) or nickel alloys (Ni-plated copper) and is classified into a metal plate 211 for both terminal potentials which measures maximum and minimum voltages of the core pack 100 and a metal plate 221 for bank potentials which measures voltages among banks. The metal plate 201, namely the metal plate 211 for both terminal potentials and the metal plate 221 for bank potentials, is formed to connect to the corresponding unit cell 110, but the present disclosure is not limited to the shape of the metal plate 201.

The PCM (Protection Circuit Module) 300 is made of the PCB substrate 1 and serve as a BMU (Battery Management Unit) for protecting a battery against dangers such as heating and explosion caused by overcharge or overdischarge of the unit cells 110 or other external physical impacts.

A connection hole 2 is formed in the PCB substrate 1 of the protection circuit module 300 so that the upper and lower portions of the PCB substrate 1 communicate with each other, and the connecting structure of the present disclosure includes a circuit terminal unit 401 located in the connection hole 2 to be electrically connected to the circuit connecting unit 241 of the metal plate 201.

Hereinafter, in a battery pack according to the first embodiment of the present disclosure, the connecting structure for a secondary battery for electrically connecting the core pack 100 and the protection circuit module 300 by means of the metal plates 201 will be described with reference to FIGS. 3 and 4.

As shown in FIGS. 3 and 4, the connecting structure for a secondary battery according to the first embodiment of the present disclosure is configured to include circuit connecting units 241a, 241b of the metal plate 201, and circuit terminal units 401a, 401b located at the PCB substrate 1 of the protection circuit module 300, and this structure gives electric connection by a physical connection method which allows selection connection or separation of the circuit connecting units 241a, 241b and the circuit terminal units 401a, 401b.

The circuit connecting units 241a, 241b has a plate shape and pass through the connection hole 2 of the PCB substrate 1 and are inserted into the circuit terminal units 401a, 401b to electrically connect the core pack 100 and the protection circuit module 300.

The circuit terminal units 401a, 401b are surface-mounted to the upper portion of the connection hole 2 of the PCB substrate 1 by means of soldering or welding and electrically connected to the protection circuit module 300. At the portion where the circuit terminal units 401a, 401b are surface-mounted, a circuit pattern (not shown) for electrically connecting the protection circuit module 300 is formed on the PCB substrate 1.

First, as an example of the connecting structure for a secondary battery according to the first embodiment of the present disclosure, as shown in FIG. 3, the circuit connecting unit 241a and the circuit terminal unit 401a may be configured. The circuit connecting unit 241a has a plate shape, and the circuit terminal unit 401a has an insert groove 411a into which the plate-shaped circuit connecting unit 241a is inserted. An elastic surface 421a surface-contacting with the circuit connecting unit 241a to fix the circuit connecting unit 241a is provided in the insert groove 411a of the circuit terminal unit 401a. In other words, the circuit connecting unit 241a is tightly adhered by an elastic force applied by the elastic surface 421a and fixed to the inside of the circuit terminal unit 401a. At this time, a separate means for selectively releasing the elastic force of the elastic surface 421a may be provided at the circuit terminal unit 401a in order to cut the connection of the circuit connecting unit 241a.

As another example, as shown in FIG. 4, the circuit connecting unit 241b and the circuit terminal unit 401b may be configured. The circuit connecting unit 241b further has coupling grooves 250 formed at both edges in the width direction, and the circuit terminal unit 401b includes an elastic piece 421b inserted into the coupling groove 250 of the circuit connecting unit 241b in the insert groove 411b to fix the circuit connecting unit 241b. In other words, the circuit connecting unit 241b is fixed at the inside of the circuit terminal unit 401b as the elastic piece 421b is inserted into the coupling groove 250. At this time, the circuit terminal unit 401b may further include a means for selectively releasing the coupling of the elastic piece 421b in order to cut the connection of the circuit connecting unit 241b.

Figure 5:
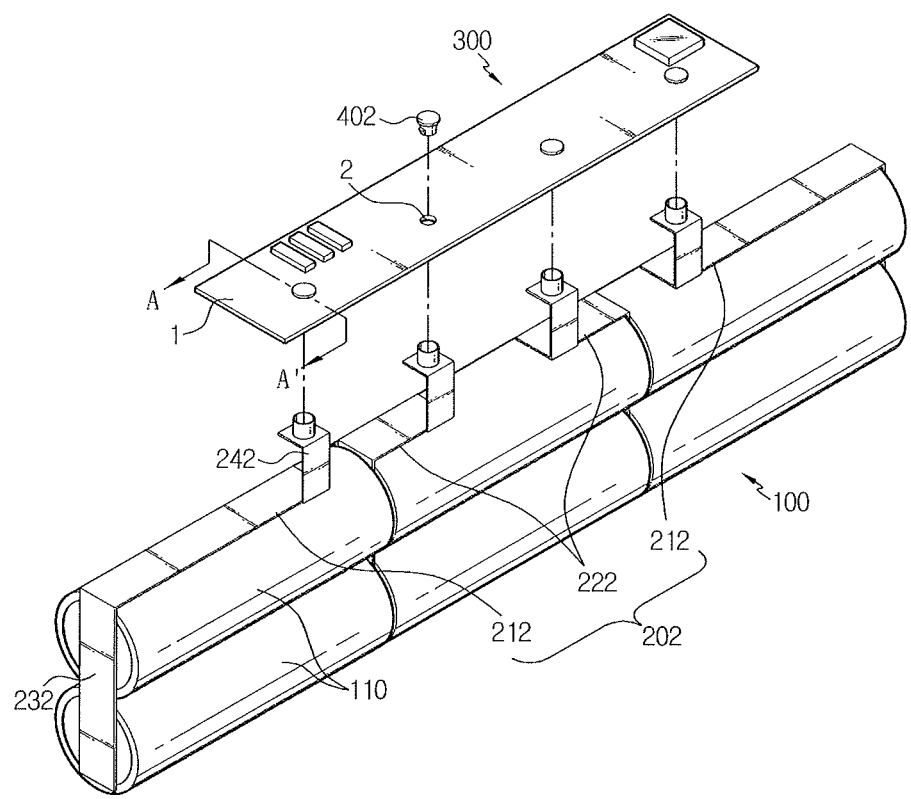
FIG. 5 is a partially-exploded perspective view schematically showing a battery pack according to a second embodiment of the present disclosure.
Figure 6:
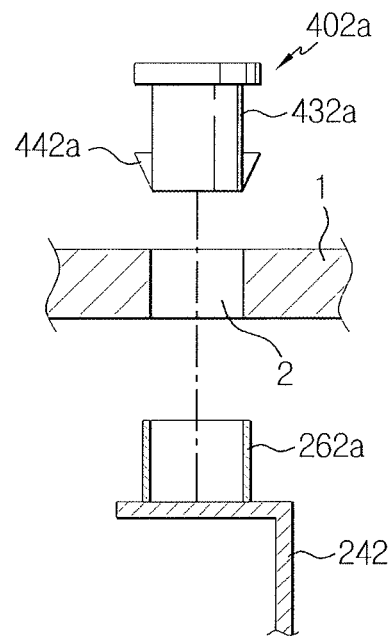
FIGS. 6 and 7 are cross-sectional views showing an example of a connecting structure for a secondary battery according to the second embodiment of the present disclosure, taken along the line A-A' of FIG. 5.
Figure 7:
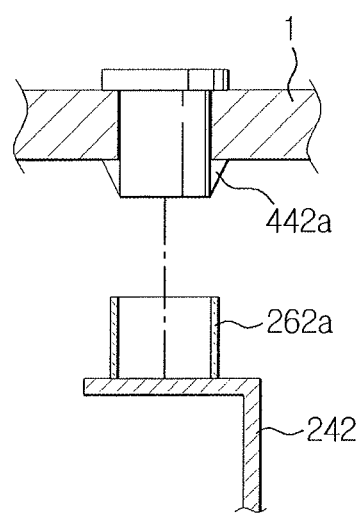
Figure 8:
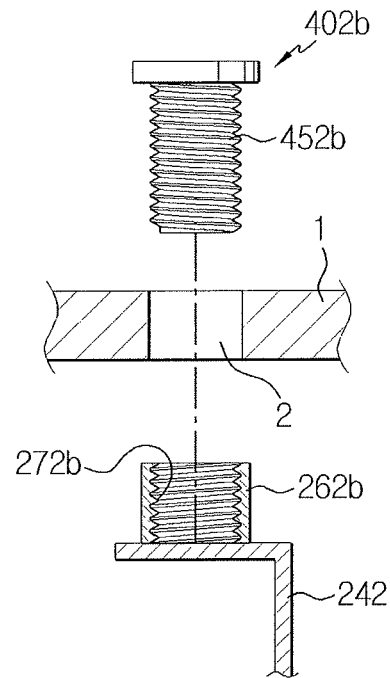
FIGS. 8 and 9 are cross-sectional views showing another example of the connecting structure for a secondary battery according to the second embodiment of the present disclosure, taken along the line A-A' of FIG. 5.
Figure 9:
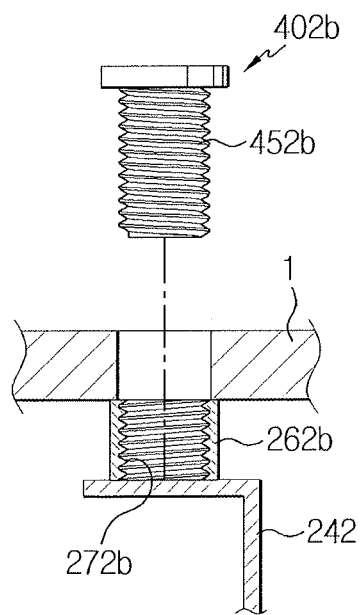

FIG. 5 is a partially-exploded perspective view schematically showing a battery pack according to a second embodiment of the present disclosure, FIGS. 6 and 7 are cross-sectional views showing examples of a connecting structure for a secondary battery according to the second embodiment of the present disclosure, taken along the line A-A' of FIG. 5, and FIGS. 8 and 9 are cross-sectional views showing other examples of the connecting structure for a secondary battery according to the second embodiment of the present disclosure, taken along the line A-A' of FIG. 5.

Referring to FIG. 5, the battery pack according to the second embodiment of the present disclosure is substantially identical to that of the first embodiment, except for the connecting structure for a secondary battery. In other words, the second embodiment has differences in the configuration of a metal plate 202 and a circuit terminal unit 402 located at the PCB substrate 1 of the protection circuit module 300. Therefore, the identical components except for the connecting structure for a secondary battery will not be described in detail here.

The metal plate 202 is used for electrically connecting each unit cell 100 of the core pack 100 to the protection circuit module 300 and includes an electrode connecting unit 232 connected to an electrode of each unit cell 110 and a circuit connecting unit 242 connected to the protection circuit module 300.

The metal plate 202 is classified into a metal plate 212 for both terminal potentials which measures maximum and minimum voltages of the core pack 100 and a metal plate 222 for bank potentials which measures voltages among banks, similar to the first embodiment. The metal plate 202, namely the metal plate 212 for both terminal potentials and the metal plate 222 for bank potentials, is formed to connect to the corresponding unit cell 110, but the present disclosure is not limited to the shape of the metal plate 202.

A connection hole 2 is formed in the PCB substrate 1 of the protection circuit module 300 so that the upper and lower portions of the PCB substrate 1 communicate with each other, and the connecting structure of the present disclosure includes a circuit terminal unit 402 located in the connection hole 2 to be electrically connected to the circuit connecting unit 242 of the metal plate 202.

Hereinafter, in a battery pack according to the second embodiment of the present disclosure, the connecting structure for a secondary battery for electrically connecting the core pack 100 and the protection circuit module 300 by means of the metal plates 202 will be described with reference to FIGS. 6 to 9.

As shown in FIGS. 6 to 9, the connecting structure for a secondary battery according to the second embodiment of the present disclosure is configured to include a coupling unit 262a or a screw coupling unit 262b provided at the circuit connecting unit 242 of the metal plate 202, and circuit terminal units 402a, 402b located at the PCB substrate 1 of the protection circuit module 300, and this structure gives electric connection by a physical connection method which allows selection connection or separation of the coupling unit 262a or the screw coupling unit 262b of the circuit connecting unit 242 and the circuit terminal units 402a, 402b.

The circuit terminal units 402a, 402b are inserted into and coupled in the connection hole 2 of the PCB substrate 1 and electrically connected to the protection circuit module 300. At the portion where the circuit terminal units 402a, 402b are coupled, a circuit pattern (not shown) for electrically connecting the protection circuit module 300 is formed on the PCB substrate 1.

The circuit connecting unit 242 has a plate shape and has an upper portion bent perpendicularly, and a coupling unit 262a or a screw coupling unit 262b is formed at the bent upper surface. The coupling unit 262a or the screw coupling unit 262b electrically connects the core pack 100 and the protection circuit module 300, coupled to the circuit terminal units 402a, 402b.

First, as an example of the connecting structure for a secondary battery according to the second embodiment of the present disclosure, as shown in FIGS. 6 and 7, the coupling unit 262a of the circuit connecting unit 242 and the circuit terminal unit 402a may be configured. The circuit terminal unit 402a has a cylindrical shape, and a hooking protrusion 442a is formed on the outer circumference 432a thereof. The circuit terminal unit 402a is inserted into and coupled in the connection hole 2 of the PCB substrate 1 by means of the hooking protrusion 442a and electrically connected to the protection circuit module 300. The circuit connecting unit 242 includes a cylindrical coupling unit 262a coupled to the PCB substrate 1 and fit into the circuit terminal unit 402a protruding below the PCB substrate 1, and the coupling unit 262a is formed by bending an upper portion of the circuit connecting unit 242 perpendicular and being united to the bent upper surface by means of welding or compression. In other words, the circuit terminal unit 402a is, as shown in FIG. 7, inserted into and coupled in the connection hole 2 of the PCB substrate 1, and its cylindrical portion where the hooking protrusion 442a is located protrudes below the PCB substrate 1. The coupling unit 262a of the circuit connecting unit 242 is coupled to the protruding portion by fitting and is fixed to the circuit terminal unit 402a. At this time, at the inside of the coupling unit 262a of the circuit connecting unit 242, a groove may be formed so that the hooking protrusion 442a may be fit thereto.

As another example, as shown in FIGS. 8 and 9, the screw coupling unit 262b of the circuit connecting unit 242 and the circuit terminal unit 402b may be configured. The circuit terminal unit 402b has a cylindrical shape and a thread 452b is formed on the outer circumference thereof with a bolt shape. The circuit connecting unit 242 has a screw coupling unit 262b having a thread 272b formed therein to correspond to the thread 452b of the circuit terminal unit 402b so as to be coupled to the circuit terminal unit 402b by bolt coupling, and the screw coupling unit 262b is formed by bending an upper portion of the circuit connecting unit 242 perpendicularly and being united to the bent upper surface by welding or compression. In other words, the screw coupling unit 262b of the circuit connecting unit 242 is, as shown in FIG. 9, located at the lower portion of the connection hole 2 of the PCB substrate 1, and the circuit terminal unit 402b passes through the connection hole 2 of the PCB substrate 1 and is bolt-coupled to the screw coupling unit 262b so as to fix the screw coupling unit 262b of the circuit connecting unit 242. At this time, the circuit terminal unit 402b is bolt-coupled to the screw coupling unit 262b and fixed to the PCB substrate 1 so as to be electrically connected to the protection circuit module 300.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A connecting structure for a secondary battery for electrically connecting between a core pack where two or more unit cells are electrically connected and a protection circuit module made of a PCB substrate having a connection hole therethrough, the connecting structure comprising:
   a metal plate having an electrode connecting unit connected to an electrode of each unit cell of the core pack and a circuit connecting unit having a plate shape so as to be connected to the protection circuit module; and
   a circuit terminal unit having an insert groove into which the plate shape of the circuit connection unit is inserted, and surface-mounted on an upper surface of the PCB substrate to cover the connection hole such that an open portion of the insert groove communicates with the connection hole,
   wherein the plate shape of the circuit connecting unit is plugged into the insert groove or plugged out from the insert groove, through the connection hole.

2. The connecting structure for a secondary battery according to claim 1, wherein the circuit terminal unit is electrically connected to the protection circuit module.

3. The connecting structure for a secondary battery according to claim 1,
wherein the circuit terminal unit further includes an elastic surface surface-contacting with the circuit connecting unit in the insert groove to fix the circuit connecting unit.

4. The connecting structure for a secondary battery according to claim 1, wherein the circuit connecting unit further has coupling grooves formed at both edges thereof in the width direction.

5. The connecting structure for a secondary battery according to claim 4, wherein the circuit terminal unit includes an elastic piece inserted into the coupling groove of the circuit connecting unit in the insert groove to fix the circuit connecting unit.

6. The connecting structure for a secondary battery according to claim 1, wherein the metal plate is made of nickel.

7. The connecting structure for a secondary battery according to claim 1, wherein the unit cell is a cylindrical battery.

8. A battery pack including the connecting structure for a secondary battery defined in claim 1.

9. The connecting structure for a secondary battery according to claim 1, wherein the circuit terminal unit surface-mounted on the upper surface of the PCB substrate is directly connected to the upper surface of the PCB substrate, and protrudes from the upper surface of the PCB substrate.

10. The connecting structure for a secondary battery according to claim 1, wherein the upper surface of the PCB substrate on which the circuit terminal unit is surface-mounted is a far side surface of the PCB substrate with respect to the circuit connecting unit, not a connecting surface of the PCB substrate to which the circuit connecting unit is connected.

11. The connecting structure for a secondary battery according to claim 1, wherein an interior of the protruding circuit terminal unit surface-mounted on the upper surface of the PCB substrate forms the insert groove into which the plate shape of the circuit connection unit is inserted.

12. The connecting structure for a secondary battery according to claim 1, wherein the circuit terminal unit surface-mounted on the upper surface of the PCB substrate is directly connected to the upper surface of the PCB substrate, and protrudes from the upper surface of the PCB substrate,
wherein the upper surface of the PCB substrate on which the circuit terminal unit is surface-mounted is a far side surface of the PCB substrate with respect to the circuit connecting unit, and not a connecting surface of the PCB substrate to which the circuit connecting unit is connected, and
wherein an interior of the protruding circuit terminal unit surface-mounted on the upper surface of the PCB substrate forms the insert groove into which the plate shape of the circuit connection unit is inserted.

* * * * *